US011584364B2

(12) United States Patent
Shimamoto et al.

(10) Patent No.: US 11,584,364 B2
(45) Date of Patent: Feb. 21, 2023

(54) VEHICLE CONTROL DEVICE, VEHICLE, OPERATION METHOD FOR VEHICLE CONTROL DEVICE AND STORAGE MEDIUM

(71) Applicant: HONDA MOTOR CO., LTD., Tokyo (JP)

(72) Inventors: Gaku Shimamoto, Wako (JP); Junpei Noguchi, Wako (JP); Tomonori Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 17/095,896

(22) Filed: Nov. 12, 2020

(65) Prior Publication Data

US 2021/0155231 A1 May 27, 2021

(30) Foreign Application Priority Data

Nov. 21, 2019 (JP) .............................. JP2019-210606

(51) Int. Cl.
*B60W 30/06* (2006.01)
*B60W 50/10* (2012.01)
(Continued)

(52) U.S. Cl.
CPC ............ *B60W 30/06* (2013.01); *B60W 10/20* (2013.01); *B60W 50/10* (2013.01); *G05D 1/005* (2013.01);
(Continued)

(58) Field of Classification Search
CPC ...... B60W 30/06; B60W 10/20; B60W 50/10; B60W 2556/45; G05D 1/005; G05D 2201/0213
See application file for complete search history.

(56) References Cited

U.S. PATENT DOCUMENTS 10,831,187 B2 11/2020 Bourassi et al.
2014/0309834 A1* 10/2014 Choi ................. B62D 15/0285
701/23

(Continued)

FOREIGN PATENT DOCUMENTS

JP 2019514088 A 5/2019
WO 2017125514 A1 7/2017

*Primary Examiner* — Hunter B Lonsberry
*Assistant Examiner* — Harrison Heflin
(74) *Attorney, Agent, or Firm* — Thomas | Horstemeyer, LLP (57) ABSTRACT

A vehicle control device comprising: a control unit configured to control an automated parking mode based on a shift position of a transmission when an automated parking is instructed, wherein the automated parking mode includes a first automated parking mode in which steering is not executed and forward movement or rearward movement is possible and a second automated parking mode in which a parking space is detected and steering is executed automatically, and the control unit controls the automated parking mode to be in the first automated parking mode, in a case where the shift position is a first position, and selectively controls the automated parking mode to be in the first automated parking mode or the second automated parking mode, in a case where the shift position is a second position that differs from the first position.

8 Claims, 3 Drawing Sheets

(51) Int. Cl.
    *B60W 10/20*         (2006.01)
    *G05D 1/00*          (2006.01)

(52) U.S. Cl.
    CPC . *B60W 2556/45* (2020.02); *G05D 2201/0213* (2013.01)

(56) References Cited

U.S. PATENT DOCUMENTS

| | | | |
|---|---|---|---|
| 2019/0018404 A1 | 1/2019 | Bourassi et al. | |
| 2019/0061818 A1* | 2/2019 | Hiei | F16H 63/40 |
| 2019/0285173 A1* | 9/2019 | Chiba | B60K 35/00 |
| 2020/0298839 A1* | 9/2020 | Inoue | B62D 15/0285 |
| 2020/0401127 A1* | 12/2020 | Kramer | G05D 1/0011 |
| 2021/0107359 A1* | 4/2021 | Takagi | B60K 35/00 |
| 2022/0017072 A1* | 1/2022 | Hayakawa | B60Q 1/525 |

\* cited by examiner

VEHICLE CONTROL DEVICE, VEHICLE, OPERATION METHOD FOR VEHICLE CONTROL DEVICE AND STORAGE MEDIUM

CROSS-REFERENCE TO RELATED APPLICATION

This application claims priority to and the benefit of Japanese Patent Application No. 2019-210606 filed on Nov. 21, 2019, the entire disclosure of which is incorporated herein by reference.

BACKGROUND OF THE INVENTION

Field of the Invention

The present invention relates to a vehicle control device, a vehicle, an operation method for the vehicle control device, and a storage medium.

Description of the Related Art

Japanese Patent Laid-Open No. 2019-514088 discloses a technology for controlling forward movement and rearward movement of a vehicle using a remote operation device.

However, an issue with the technology described in Japanese Patent Laid-Open No. 2019-514088 is that an automated parking mode involving forward movement or rearward movement without steering cannot be selected inside the vehicle, and needs to be selected and instructed with an operation terminal.

The present invention provides a technology that enables an automated parking mode involving forward movement or rearward movement without steering to be selected inside the vehicle.

SUMMARY OF THE INVENTION

According to one aspect of the present invention, there is provided a vehicle control device for controlling automated parking of a vehicle according to an instruction from a remote operation terminal, the device comprising: an instruction unit configured to instruct a start of the automated parking; and a control unit configured to control an automated parking mode based on a shift position of a transmission when the automated parking is instructed by the instruction unit, wherein the automated parking mode includes a first automated parking mode in which steering is not executed and forward movement or rearward movement is possible and a second automated parking mode in which a parking space is detected and steering is executed automatically, and the control unit, when the automated parking is instructed, controls the automated parking mode to be in the first automated parking mode, in a case where the shift position is a first position, and selectively controls the automated parking mode to be in the First automated parking mode or the second automated parking mode, in a case where the shift position is a second position that differs from the first position.

DESCRIPTION OF THE EMBODIMENTS

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

Configuration of Vehicle Control System

Figure 1:
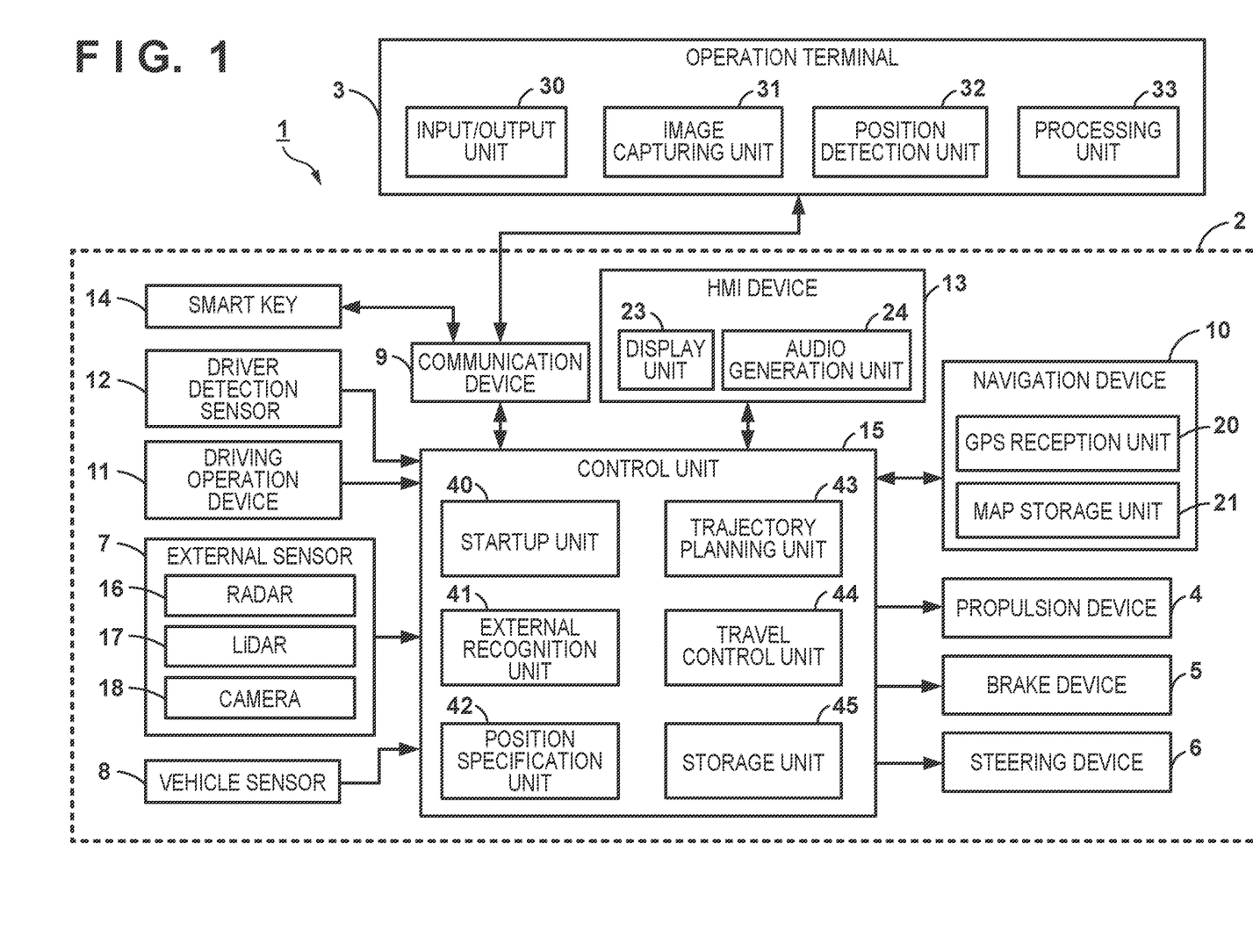
FIG. 1 is a block diagram showing a functional configuration of a vehicle control system according to an embodiment.

FIG. 1 is a block diagram showing a functional configuration of a vehicle control system according to an embodiment. As shown in FIG, 1, a vehicle control system 1 has a vehicle system 2 installed in a vehicle and an operation terminal 3. The vehicle system 2 has a propulsion device 4, a brake device 5, a steering device 6, an external sensor 7, a vehicle sensor 8, a communication device 9, a navigation device 10, a driving operation device 11, a driver detection sensor 12, an interface device (HMI device) 13, a smart key 14, and a control device 15. The components of the vehicle system 2 are connected in a manner that enables signal transmission by an in-vehicle communication network such as CAN (Controller Area Network).

The propulsion device 4 is a device that applies a driving force to the vehicle, and includes a power supply and a transmission, for example. The power supply has at least one of an internal combustion engine such as a gasoline engine or a diesel engine and an electric motor. The brake device 5 is a device that applies braking force to the vehicle, and includes a brake caliper that presses pads against a brake rotor and an electric cylinder that supplies hydraulic pressure to the brake caliper, for example. The brake device 5 includes a parking brake device that regulates rotation of the wheels with a wire cable. The steering device 6 is a device for changing the steering angle of the wheels, and has a rack and pinion mechanism that steers the wheels and an electric motor that drives the rack and pinion mechanism, for example. The propulsion device 4, the brake device 5 and the steering device 6 are controlled by the control device 15.

The external sensor 7 is a sensor that detects objects around the vehicle, or the like. The external sensor 7 includes a radar 16, a LiDAR 17 (Light Detection and Ranging) and a camera 18, and outputs detection results to the control device 15.

The radar 16 is a milliwave radar, for example, and is capable of detecting objects on the periphery of the vehicle by radio waves, and measuring the distance to objects, A plurality of radars 16 are provided on the periphery of the vehicle, and the radars 16 are, for example, provided one in the middle of the front portion of the vehicle, one in each corner of the front portion, and one in each corner of the rear portion.

The LiDAR 17 is capable of optically detecting objects on the periphery of the vehicle and measuring the distance to objects. A plurality of LiDARs 17 are provided on the periphery of the vehicle, and the LiDARs 17 are, for example, provided one in each corner of the front portion of the vehicle, one in the middle of the rear portion, and one on each side of the rear portion.

The camera 18 is a device that captures images of the periphery of the vehicle, and is, for example, a digital camera utilizing a solid-state image sensor such as a CCD or CMOS image sensor. The camera 18 includes a forward camera that captures images forward of the vehicle and a rearward camera that captures images rearward. The camera 18 includes a left and right pair of door mirror cameras that are provided in proximity to the installation location of door mirrors of the vehicle and capture images rearward on left and right side portions.

The vehicle sensor 8 includes a speed sensor that detects the speed of the vehicle, an acceleration sensor that detects acceleration, a yaw rate sensor that detects angular velocity about a vertical axis, and a direction sensor that detects the orientation of the vehicle. The yaw rate sensor is a gyroscope sensor, for example.

The communication device 9 mediates wireless communication between the control device 15 and the operation terminal 3. That is, the control device 15 is capable of communicating with the operation terminal 3 of a user via the communication device 9, using a communication method such as infrared communication or Bluetooth (registered trademark).

The navigation device 10 is a device that acquires the current position of the vehicle and performs processing such as route guidance to a destination, and has a GPS reception unit 20 and a map storage unit 21. The GPS reception unit 20 specifies the position (latitude and longitude) of the vehicle based on signals received from satellites (positioning satellites). The map storage unit 21 is constituted by a storage device such as a flash memory or a hard disk, and stores map information.

The driving operation device 11 is provided in the vehicle interior, and receives input operations that the user performs in order to control the vehicle. The driving operation device 11 includes, for example, a steering wheel, an accelerator pedal, a brake pedal, a parking brake device, a shift lever, and a push start switch (engine start button) as operation units. The push start switch receives an input operation for starting the vehicle by a driving operation from the user. The driving operation device 11 includes a sensor that detects an operation amount, and outputs a signal indicating the operation amount to the control device 15.

The driver detection sensor 12 is a sensor for detecting whether a person is sitting in the driver's seat. The driver detection sensor 12 is a seating sensor provided in a seating surface of the driver's seat. A seating sensor may be a capacitance sensor or a membrane switch that turns on when a person sits on the driver's seat. Additionally, the driver detection sensor 12 may be an indoor camera that captures an image of the user sitting in the driver's seat. Also, the driver detection sensor 12 may be a sensor that acquires the absence or presence of the tongue buckle of the seat belt of the driver's seat, and detects that a person is sitting in the driver's seat and that the seat belt is being worn. The driver detection sensor 12 outputs the detection result to the control device 15.

The interface device 13 (HMi device) provides an interface (HNC: Hutnan Machine interface) between the control device 15 and the user, and reports various information to the user by display or audio, and receives input operations from the user. The interface device 13 has a display unit 23 that is constituted by liquid crystal, organic electroluminescence or the like, and functions as a touch panel capable of receiving input operations from the user, and an audio generation unit 24 such as a buzzer or a speaker.

The control device 15 is an electronic control unit (ECU) including a CPU, a nonvolatile memory (ROM), a volatile memory (RAM), and the like. The control device 15 is capable of executing various vehicle controls, by executing computational processing that is based on programs with the CPU. At least some of the functional units of the control device 15 may be realized by hardware such as an LSI, ASIC, FPGA or the like, or may be realized and by a combination of software and hardware.

The smart key 14 (FOB) is a portable wireless terminal that users can carry with them, and is configured to be communicable with the control device 15 via the communication device 9 from outside the vehicle. The smart key 14 is provided with buttons for user inputs, and the user is able to perform operations such as locking doors (door lock), unlocking doors (door lock release), and starting the vehicle, by operating the buttons of the smart key 14.

The operation terminal 3 is a portable wireless terminal that users can carry with them, and is capable of communicating with the control device 15 via the communication device 9 from outside the vehicle. In the present embodiment, the operation terminal 3 is a portable information processing device such as a smartphone, for example. Due to a predetermined application being installed on the operation terminal 3 in advance, the operation terminal 3 is capable of communicating with the control device 15. In the operation terminal 3, information e.g., terminal ID including predetermined numerical values, character string, etc. for identifying respective operation terminals) capable of identifying the operation terminal 3 is set, and the control device 15 is capable of performing authentication of the operation terminal 3. based on the terminal ID.

The operation terminal 3 has, as shown in FIG. 1, an input/output unit 30, an image capturing unit 31, a position detection unit 32 and a processing unit 33 as functional components.

The input/output unit 30 presents information to the user who is operating the operation terminal 3, and receives inputs from the user who is operating the operation terminal 3. The input/output unit 30 functions as a touch panel, for example, and, upon receiving an input from the user, the input/output unit 30 outputs a signal corresponding to the input to the processing unit 33.

The image capturing unit 31 is capable of capturing images (still images, moving images) in an image capturing mode set from the input/output unit 30, and the image capturing unit 31 is, for example, a digital camera constituted by a CMOS image sensor and the like. The processing unit 33 is capable of performing authentication of the user who is operating the operation terminal 3 by performing predetermined image processing on an image captured of the user to acquire features of the image, and comparing the acquired features with the features of face images of users registered in advance.

The position detection unit 32 includes a sensor that is capable of acquiring position information of the operation terminal 3. The position detection unit 32 is capable of acquiring the position of the operation terminal 3 by receiving signals from geodetic satellites (GPS satellites), The position detection unit 32 is also capable of acquiring position information including the relative position of the operation terminal 3 to the vehicle, by communicating with the control device 15 via the communication device 9. The position detection unit 32 outputs the acquired position information to the processing unit 33.

The processing unit 33 transmits the terminal ID that is set for the operation terminal 3, signals from the input/output unit 30, and position information acquired by the position detection unit 32 to the control device 15. Also, upon receiving a signal from the control device 15. the processing unit 33 processes the signal and presents information to the user who is operating the operation terminal 3 on the input/output unit 30. Information is presented by being displayed on the input/output unit 30, for example.

The control device 15 is able to drive the vehicle based on signals from the operation terminal 3. The control device 15 is able to, fix example, remotely perform control for moving the vehicle to a predetermined position such as remote parking, In order to control the vehicle, the control device 15 has at least a startup unit 40, an external recognition unit 41, a position specification unit 42, a trajectory planning unit 43, a travel control unit 44, and a storage unit 45.

The startup unit 40 performs authentication of the smart key 14, based on a signal from a push start switch, and determines whether the smart key 14 is inside the vehicle. When the smart key 14 is authenticated and the smart key 14 is inside the vehicle, the startup unit 40 starts the drive of the propulsion device 4. Also, the startup unit 40, upon receiving a signal that instructs startup from the operation terminal 3, performs authentication of the operation terminal 3, and, when the operation terminal 3 is authenticated, starts the drive of the vehicle. The startup unit 40, when starting the drive of the vehicle, turns on the ignition in the case where the propulsion device 4 includes an internal combustion engine.

The external recognition unit 41 recognizes obstacles such as parked cars and walls, people and other objects, for example, that are present around the vehicle, based on the detection results of the external sensor 7, and acquires information such as position and size relating to the obstacles, people and other objects, Also, the external recognition unit 41 is capable of analyzing images acquired by the camera 18, based on an image analysis technique such as pattern matching, and acquiring whether there are obstacles, people and other objects and the size thereof. Furthermore, the external recognition unit 41 is capable of calculating the distance to an obstacle or person using signals from the radars 16 or the LiDARs 17, and acquiring the position of the obstacle or person.

The position specification unit 42 is capable of detecting the position of the vehicle, based on signals from the GPS reception unit 20 of the navigation device 10. The position specification unit 42 is also capable of acquiring speed and yaw rate from the vehicle sensor 8, in addition to signals from the GPS reception unit 20, and specifying the position and orientation of the vehicle using so-called inertial navigation.

The external recognition unit 41 is able to analyze detection results of the external sensor 7, or more specifically, images captured by the camera 18, based on an image analysis technique such as pattern matching, and is, for example, able to acquire the position of white lines painted on the road surface of parking lots and the like.

The travel control unit 44 controls the propulsion device 4, the brake device 5 and the steering device 6, and causes the vehicle to travel, based on instructions for travel control front the trajectory planning unit 43.

The storage unit 45 is constituted by a RAM or the like, and stores information required in processing by the trajectory planning unit 43 and the travel control unit 44.

The trajectory planning unit 43, upon there being an input to the HMI device 13 or the operation terminal 3 from the user, calculates a trajectory to serve as the travel route of the vehicle and outputs instructions for travel control to the travel control unit 44, as needed.

The trajectory planning unit 43 performs parking assist processing, when there has been an input corresponding to a desire for parking assist by remote operation (remote parking assist) from the user after the vehicle has stopped.

In the case of performing parking assist processing, the trajectory planning unit 43 initially performs acquisition processing for acquiring positions where the vehicle can be parked. The trajectory planning unit 43 acquires the position and size of obstacles and the position of white lines painted on the road surface, based on signals from the external sensor 7. The trajectory planning unit 43 extracts spaces where the vehicle can he parked (hereinafter, parkable positions), based on white lines and the position and size of obstacles that were acquired.

Next, the trajectory planning unit 43 performs parking position reception processing for receiving a parking position from the parkable positions. The trajectory planning unit 43, upon acquiring at least one parkable position, displays a notification on the display unit 23 instructing the user who is driving to stop the vehicle. At this time, the trajectory planning unit 43 is capable of instructing the user who is driving to put the shift lever in the parking position, after having stopped the vehicle.

The trajectory planning unit 43 displays the current position of the vehicle and the parkable positions on the display unit 23. At this time, the trajectory planning unit 43 is also capable of displaying images acquired by the camera 18 on the display unit 23 in an overlaid manner. Thereafter, the trajectory planning unit 43 performs display notifying the user to select one of the packable positions as the position to park the vehicle (parking position) on the display unit 23. Upon a desired parking position being input by the user, the display unit 23 outputs a signal corresponding to the input parking position to the trajectory planning unit 43.

At this time, the trajectory planning unit 43 acquires the desired parking position from the user, based on a position touched by the user. At this time, the trajectory planning unit 43 is capable of displaying buttons for the user to select one of front end parking and back-in parking on the display unit 23. The trajectory planning unit 43 is also capable of calculating trajectories from the current position of the vehicle to the parking position that correspond respectively to front end parking and back-in parking, and displaying the calculated trajectories on the display unit 23. The display unit 23 enables the user to select front end parking or back-in parking by a touch operation on the trajectory, and outputs the selection result to the trajectory planning unit 43.

Next, the trajectory planning unit 43, upon receiving the parking position input by the user from the display unit 23, performs trajectory calculation processing for calculating the trajectory of the vehicle from the current position of the vehicle to the parking position. When an input operation by the user relating to selection of front end parking and back-in parking is received, the trajectory planning unit 43 is capable of calculating a trajectory based on the input by the user, in addition to the current position of the vehicle and the parking position.

Upon the trajectory calculation ending, the trajectory planning unit 43 displays a notification on the display unit 23 prompting the user to get out of the vehicle, and displays a notification instructing the user to start an application for remote parking on the operation terminal 3. After getting out of the vehicle, the user starts the application on the operation terminal 3, in accordance with these notifications.

Thereafter, an input button for performing connection execution to the vehicle is displayed on the input/output unit 30 of the operation terminal 3. Upon the user touching the input button, the trajectory planning unit 43 performs authentication processing for authenticating the operation terminal 3 using a terminal ID transmitted from the processing unit 33. Upon authentication of the operation terminal 3 being completed, the current position of the vehicle, the trajectory, the parking position and an up-arid-down directional arrow are displayed on the input/output unit 30. Thereafter, the user is able to instruct the trajectory planning unit 43 to execute remote parking processing, by performing an input to the operation terminal 3. The remote parking processing includes move processing for moving the vehicle to the parking position, and parking processing for parking the vehicle in the parking position.

Upon the user swiping the arrow displayed on the input/output unit 30 of the operation terminal 3, the operation terminal 3 transmits an operation amount signal that depends on the swipe amount to the trajectory planning unit 43. The trajectory planning unit 43 performs move processing for converting the operation amount signal into a movement amount of the vehicle, and moving the vehicle by the calculated movement amount along the trajectory until the vehicle reaches the parking position.

The trajectory planning unit 43, in the move processing, determines whether the vehicle has reached the parking position, and, when it is determined that the vehicle has reached the parking position, performs parking processing for parking the vehicle. In the parking processing, the trajectory planning unit 43 first drives the brake device 5 of the travel control unit 44. Thereafter, the trajectory planning unit 43 drives the parking brake of the travel control unit 44. Upon stopping of the vehicle being completed, the trajectory planning unit 43 transmits a parking completion notification indicating that parking has been completed to the operation terminal 3.

The operation terminal 3, upon the parking completion notification being received, displays a notification on the input/output unit 30 of the operation terminal 3 indicating that parking has been completed, and ends the application of the operation terminal 3. Parking assist processing is thereby completed.

Processing

Figure 2:
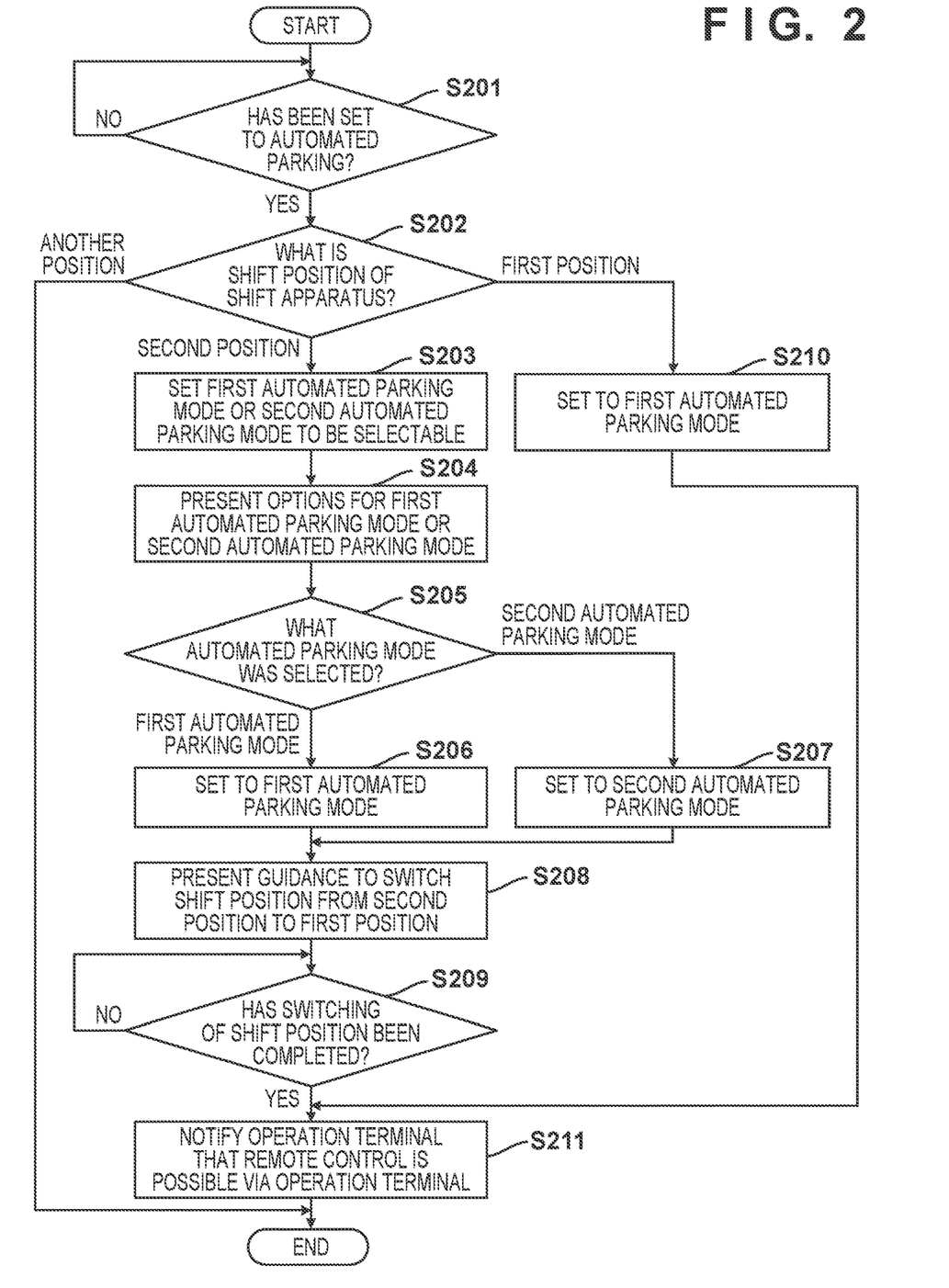
FIG. 2 is a flowchart showing the procedure of processing that is implemented by a vehicle control device according to the embodiment.

Next, a procedure of processing implemented by the vehicle control device (control device 15) according to the present embodiment will be described, with reference to the flowchart in FIG. 2. In the present embodiment, a situation before a remote operation terminal (operation terminal 3) is operated from a position away from the vehicle and sends a vehicle move instruction, and automated parking control of the vehicle is executed, that is, before the user gets out of the vehicle in order to perform automated parking, is envisioned.

In step S201, the control device 15 of the vehicle system 2 determines whether automated parking has been set. For example, it is determined that automated parking has been set in the case where a button provided in the vehicle for giving an instruction to start automated parking is pressed. Alternatively, in the case where the display unit 23 is a touch panel display, an automated parking start instruction may be input by a touch operation, or an automated parking start instruction may be input by speech recognition. If automated parking has been set, the processing proceeds to step S202. On the other hand, if automated parking has not been set, the control device 15 stands by.

In step S202, the control device 15 determines the shift position of the transmission that is included in the propulsion device 4. If the shift position is a first position (e.g., P (parking) range), the processing proceeds to step S210. If the shift position is the second position e.g., D (drive) range), the processing proceeds to step S203. If the shift position is another position, the processing is ended without executing automated parking. At this time, the guidance "Please change the shift position" may be presented.

In step S203, the control device 15 selectable sets the first automated parking mode or the second automated parking mode.

Here, the first automated parking mode is an automated parking mode in which steering is not executed and forward movement or rearward movement is possible. The user is able to automatically park the vehicle by operating the operation terminal 3 and sending a forward movement or rearward movement instruction to the vehicle after getting out of the vehicle. Also, the second automated parking mode is an automated parking mode in which a parking space is detected from an image acquired by the camera 18 and steering is executed automatically. Similarly, in this mode, by the user operating the operation terminal 3 and giving an instruction after getting out of the vehicle, the vehicle is able to park in a parking space while performing the steering operation automatically while acquiring peripheral information.

Figure 3:
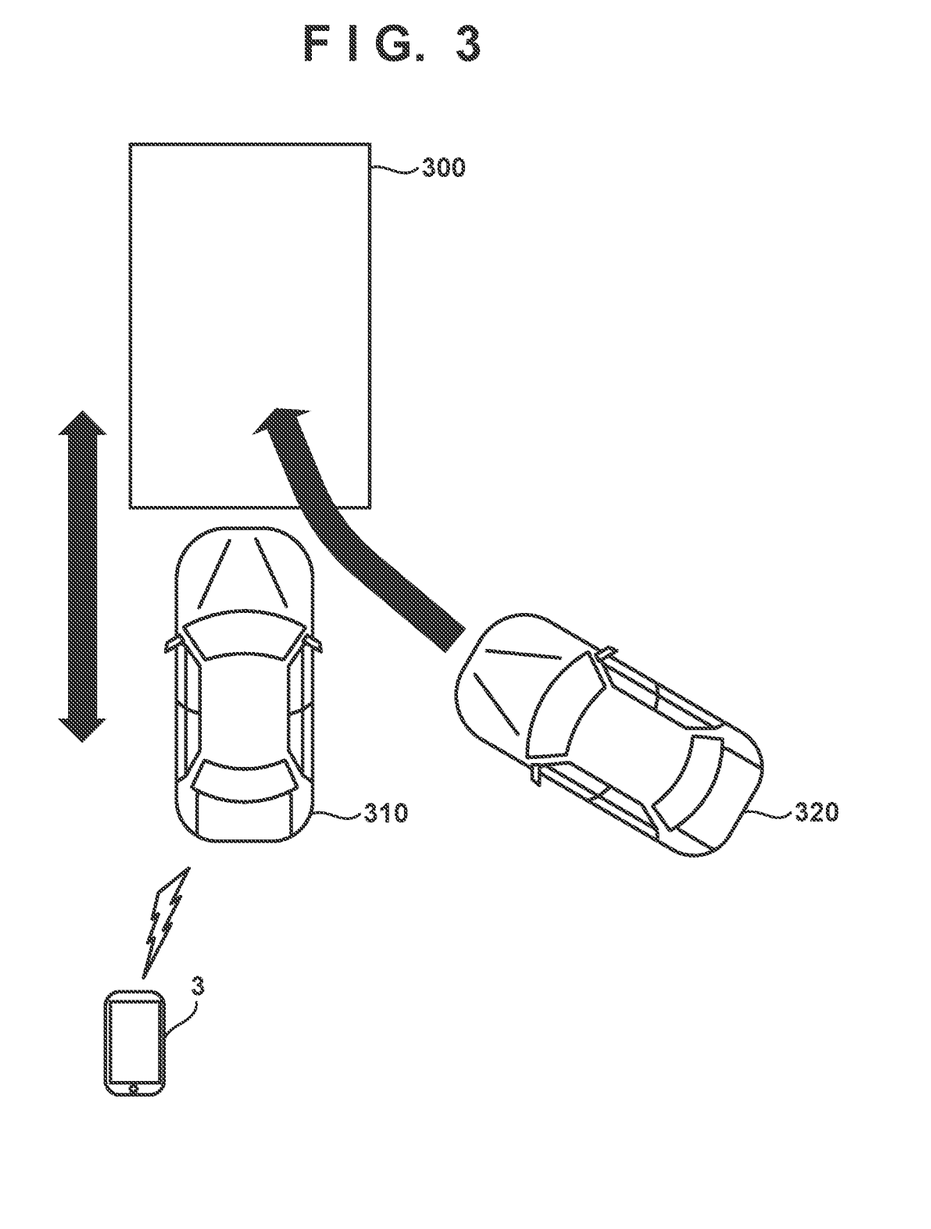
FIG. 3 is an illustrative diagram of automated parking modes that depend on a shift position according to the embodiment.

Here, FIG. 3 is an illustrative diagram of the first automated parking mode and the second automated parking mode according to the present embodiment. The first automated parking mode is a mode applicable to a vehicle 310 that is substantially lined up with a parking space 300. As shown by the straight arrow, in this mode, the vehicle is movable in the forward or rearward direction, according to an instruction from the operation terminal 3, but is not steered. On the other hand, the second automated parking mode is a mode applicable to a vehicle 320 that is at an angle to the parking space 300. As shown by the curved arrow, in this mode, the vehicle is automatically movable with steering, according to an instruction from the operation terminal 3, In step S204, the control device 15 presents an option to select the first automated parking mode or the second automated parking mode. For example, the selection options are displayed on the display unit 23 so as to select one of the automated parking modes.

In step S205, the control device 15 determines which automated parking mode was selected, out of the selection options presented in step S204. If the first automated parking mode was selected, the processing proceeds to step S206. On the other hand, if the second automated parking mode was selected, the processing proceeds to step S207.

In step S206, the control device 15 sets the automated parking mode to the first automated parking mode. In step S207, the control device 15 sets the automated parking mode to the second automated parking mode.

In step S208, the control device 15 presents guidance so as to switch the shift position from the current second position (e.g., D range) to the first position (e.g., P range). For example, a text message prompting switching is displayed on the display unit 23.

in step S209, the control device 15 determines whether switching of the shift position has been completed. If switching has been completed, the processing proceeds to step S211. On the other hand, if switching has not been completed, the control device 15 stands by until switching has been completed. If switching is not performed within a predetermined time period, automated parking may be canceled.

In step S210, the control device 15 sets the automated parking mode to the first automated parking mode.

In step S211, the control device 15 notifies the operation terminal 3 that remote control of the vehicle via the operation terminal 3 is possible. In the case where a person gets out of the vehicle in a state where the shift position has been shifted to the first position (e.g., P range), control is performed such that the power supply of the vehicle is not turned off in order to enable remote control after the person has gotten out of the vehicle. It is thereby possible to avoid a situation where, when a person gets out of the vehicle with the shift position not having been switched to the first position (e.g., P range) and still in the second position (e.g., D range), power supply of the vehicle is turned off due to control of the smart key 14 being prioritized (due to no longer being able to detect the smart key 14 inside the vehicle), resulting in remote control no longer being executable. On the other hand, in the case where a person gets out of the vehicle when the remote control has not been enabled, the power supply of the vehicle is turned off. It can thereby be recognized that remote control cannot be executed.

After receiving notification that remote control of the vehicle is possible, the remote operation application of the operation terminal 3 is started, remote operation is received, and automated parking control that depends on the set automated parking mode is executed, based on the received operation. At this time, the power supply of the vehicle remains on, enabling the user to shift to remote control smoothly. Thus ends the processing of FIG. 2.

As described above, in the present embodiment, in the case where the shift position is the first position (e.g., P range) when automated parking is instructed, the automated parking mode is controlled to be in the first automated parking mode in which steering is not executed and forward movement or rearward movement is possible. In the case where the shift position is the second position (e.g., D range), the automated parking mode is selectively controlled to be in the first automated parking mode or the second automated parking mode in which a parking space is detected and steering is executed automatically.

An automated parking mode involving forward movement or rearward movement without steering can thereby be selected inside the vehicle. Furthermore, each automated parking mode can be selected in association with the shift operation by the user, thus enabling an automated parking mode to be selected with an intuitive operation.

Also, by overlaying lines in the forward or rearward direction on video of the camera 18, after the automated parking mode involving forward movement or rearward movement without steering has been selected inside the vehicle, it becomes possible to check whether the vehicle can be parked in the parking space in the automated parking mode involving forward movement or rearward movement without steering, before getting out of the vehicle.

Variations

The above embodiment was described taking, as shift positions, the P range as an example of the first position and the D range as example of the second position, but the present invention is not limited to this example. For example, the first position may be a non-travel position (e.g., P range or N range), and the second position may be a travel position (e.g., D1 range, D2 range, . . . ).

Also, the guidance described in the above embodiment is not limited to the display of messages on the display unit 23, and may be audio reports via the audio generation unit 24.

Also, a program that realizes one or more of the functions described in the embodiments can be supplied to a system or apparatus via a network or storage medium, and one or more processors in a computer of the system or apparatus can read out and execute this program. The present invention is also realizable by such a mode.

According to the present invention, an automated parking mode involving forward movement or rearward movement without steering can be selected inside the vehicle. Furthermore, each automated parking mode can be selected in association with the shift operation of the user, thus enabling an automated parking mode to be selected with an intuitive operation.

Summary of the Embodiment

1. A vehicle control device (e.g., 15) of the above embodiment is a vehicle control device for controlling automated parking of a vehicle according to an instruction from a remote operation terminal (e.g., 3), the device including:

an instruction unit configured to instruct a start of the automated parking; and a control unit (e.g., 44) configured to control an automated parking mode based on a shift position of a transmission when the automated parking is instructed by the instruction unit, the automated parking mode including a first automated parking mode in which steering is not executed and forward movement or rearward movement is possible and a second automated parking mode in which a parking space is detected and steering is executed automatically, and the control unit, when the automated parking is instructed, controlling the automated parking mode to be in the first automated parking mode, in a case where the shift position is a first position (e.g., P range), and selectively controlling the automated parking mode to be in the first automated parking mode or the second automated parking mode, in a case where the shift position is a second position (e.g., D range) that differs from the first position.

According to this embodiment, an automated parking mode involving forward movement or rearward movement without steering can be selected inside the vehicle. Furthermore, each automated parking mode can be selected in association with the shift operation of the user, thus enabling an automated parking mode to be selected with an intuitive operation.

2. The vehicle control device of the above embodiment further includes:

a presentation unit (e.g., 23, 24) configured to present the user with an option of selecting the first automated parking mode or the second automated parking mode, wherein the control unit sets the automated parking mode to the automated parking mode selected by the user, According to this embodiment, the user can select an automated parking mode inside the vehicle.

3. In the vehicle control device of the above embodiment, the presentation unit, in a case where selection of the automated parking mode by the user is received, further presents guidance prompting switching of the shift position from the second position to the first position, in order to enable remote control of the vehicle via the remote operation terminal.

According to this embodiment, preliminary preparation for enabling remote control of the vehicle via a remote operation terminal can be performed.

4. In the vehicle control device of the above embodiment, the control unit determines whether the shift position has been switched from the second position to the first position in accordance with the guidance, and, if it is determined that the shift position has been switched, notifies the remote operation terminal that remote control of the vehicle via the remote operation terminal is possible.

According to this embodiment, it can be readily recognized that remote control of the vehicle via a remote operation terminal is possible.

5. In the vehicle control device of the above embodiment, the control unit performs control such that, in a case where a person gets out of the vehicle in a state where the shift position has been switched to the first position, power supply of the vehicle is not turned off in order to enable the remote control after the person has gotten out of the vehicle.

According to this embodiment, the power supply of the vehicle is not turned off even in a case such as where the smart key is taken outside the vehicle, thus enabling the user to shift to remote control smoothly.

6. In the vehicle control device of the above embodiment, the control after controlling the automated parking mode to be in the first automated parking mode in a case where the shift position is the first position when the automated parking is instructed, notifies the remote operation terminal that remote control of the vehicle via the remote operation terminal is possible.

According to this embodiment, in the case where the shift position does not need to be changed, it can be recognized at an early stage that remote control of the vehicle via the remote operation terminal is possible.

7. In the vehicle control device of the above embodiment, the first position is a P range, and the second position is a D range.

According to this embodiment, in the case where the shift position is the D range, it becomes possible to select the first automated parking mode in which steering is not executed and forward movement or rearward movement is possible or the second automated parking mode in which a parking space is detected and steering is executed automatically.

8. A vehicle of the above embodiment is a vehicle comprising the vehicle control device (e.g., 15) of the above embodiment.

According to this embodiment, processing that is implemented by the vehicle control device can be realized by the vehicle.

9. An operation method for a vehicle control device (e.g., 15) of the above embodiment is an operation method of a vehicle control device for controlling automated parking of a vehicle according to an instruction from a remote operation terminal (e.g., 3), the method including:

instructing (e.g., step S201) a start of the automated parking; and controlling (e.g., steps S202 to S211) an automated parking mode based on a shift position of a transmission when the automated parking is instructed, wherein the automated parking mode includes a first automated parking mode in which steering is not executed and forward movement or rearward movement is possible and a second automated parking mode in which a parking space is detected and steering is executed automatically, and in the controlling, when the automated parking is instructed, the automated parking mode is controlled to be in the first automated parking mode, in a case where the shift position is a first position, and the automated parking mode is selectively controlled to be in the first automated parking mode or the second automated parking mode, in a case where the shift position is a second position that differs from the first position.

According to this embodiment, an automated parking mode involving forward movement or rearward movement without steering can be selected inside the vehicle. Furthermore, each automated parking mode can be selected in association with the shift operation of the user, thus enabling an automated parking mode to be selected with an intuitive operation.

10. A computer program of the above embodiment is a computer program for causing a computer to function as the vehicle control device (e.g., 15) of the above embodiment.

According to this embodiment, it becomes possible to realize the contents of the present invention by computer.

The invention is not limited to the foregoing embodiments, and various variations/changes are possible within the spirit of the invention.

What is claimed is:

1. A vehicle control device for controlling automated parking of a vehicle according to an instruction from a remote operation terminal, the device comprising:
   a button configured to instruct a start of the automated parking; and
   a control unit configured to control an automated parking mode based on a shift position of a transmission when the automated parking is instructed by the button,
   wherein the automated parking mode includes a first automated parking mode in which steering is not executed and forward movement or rearward movement is possible and a second automated parking mode in which a parking space is detected and steering is executed automatically, and
   the control unit, when the automated parking is instructed, controls the automated parking mode to be in the first automated parking mode, in a case where the shift position is a first position, and selectively controls the automated parking mode to be in the first automated parking mode or the second automated parking mode, in a case where the shift position is a second position that differs from the first position,
   the vehicle control device further comprising:
   a display configured to present the user with an option of selecting the first automated parking mode or the second automated parking mode,
   wherein the control unit sets the automated parking mode to the automated parking mode selected by the user,
   wherein the display, in a case where selection of the automated parking mode by the user is received, further presents guidance prompting switching of the shift position from the second position to the first position, in order to enable remote control of the vehicle via the remote operation terminal.

2. The vehicle control device according to claim 1, wherein the control unit determines whether the shift position has been switched from the second position to the first position in accordance with the guidance, and, if it is determined that the shift position has been switched, notifies the remote operation terminal that remote control of the vehicle via the remote operation terminal is possible.

3. The vehicle control device according to claim 2, wherein the control unit performs control such that, in a case where a person gets out of the vehicle in a state where the shift position has been switched to the first position, power supply of the vehicle is not turned off in order to enable the remote control after the person has gotten out of the vehicle.

4. The vehicle control device according to claim 1, wherein the control unit, after controlling the automated parking mode to be in the first automated parking mode in a case where the shift position is the first position when the automated parking is instructed, notifies the remote operation terminal that remote control of the vehicle via the remote operation terminal is possible.

5. The vehicle control device according to claim 1, wherein the first position is a P range, and the second position is a D range.

6. A vehicle comprising the vehicle control device according to claim 1.

7. An operation method of a vehicle control device for controlling automated parking of a vehicle according to an instruction from a remote operation terminal, the method comprising:
   instructing a start of the automated parking; and
   controlling an automated parking mode based on a shift position of a transmission when the automated parking is instructed,
   wherein the automated parking mode includes a first automated parking mode in which steering is not executed and forward movement or rearward movement is possible and a second automated parking mode in which a parking space is detected and steering is executed automatically, and
   in the controlling, when the automated parking is instructed, the automated parking mode is controlled to be in the first automated parking mode, in a case where the shift position is a first position, and the automated parking mode is selectively controlled to be in the first automated parking mode or the second automated parking mode, in a case where the shift position is a second position that differs from the first position, and
   the method further comprises:
   presenting the user with an option of selecting the first automated parking mode or the second automated parking mode on a display,
   wherein the automated parking mode is set to the automated parking mode selected by the user, and
   wherein, in a case where selection of the automated parking mode by the user is received, a guidance prompting switching of the shift position from the second position to the first position is further presented on the display in order to enable remote control of the vehicle via the remote operation terminal.

8. A non-transitory computer-readable storage medium storing a computer program for causing a computer to execute the steps of an operation method of a vehicle control device for controlling automated parking of a vehicle according to an instruction from a remote operation terminal, the computer program causing the computer to execute:
   instructing a start of the automated parking; and
   controlling an automated parking mode based on a shift position of a transmission when the automated parking is instructed,
   wherein the automated parking mode includes a first automated parking mode in which steering is not executed and forward movement or rearward movement is possible and a second automated parking mode in which a parking space is detected and steering is executed automatically, and
   in the controlling, when the automated parking is instructed, the automated parking mode is controlled to be in the first automated parking mode, in a case where the shift position is a first position, and the automated parking mode is selectively controlled to be in the first automated parking mode or the second automated parking mode, in a case where the shift position is a second position that differs from the first position, and
   the user is presented with an option of selecting the first automated parking mode or the second automated parking mode on a display,
   wherein the automated parking mode is set to the automated parking mode selected by the user, and
   wherein, in a case where selection of the automated parking mode by the user is received, a guidance prompting switching of the shift position from the second position to the first position is further presented on the display in order to enable remote control of the vehicle via the remote operation terminal.

* * * * *